G. FAVIER.
MOLDING ELECTRODES.
APPLICATION FILED APR. 15, 1914.
1,150,021.
Patented Aug. 17, 1915.
2 SHEETS—SHEET 2.
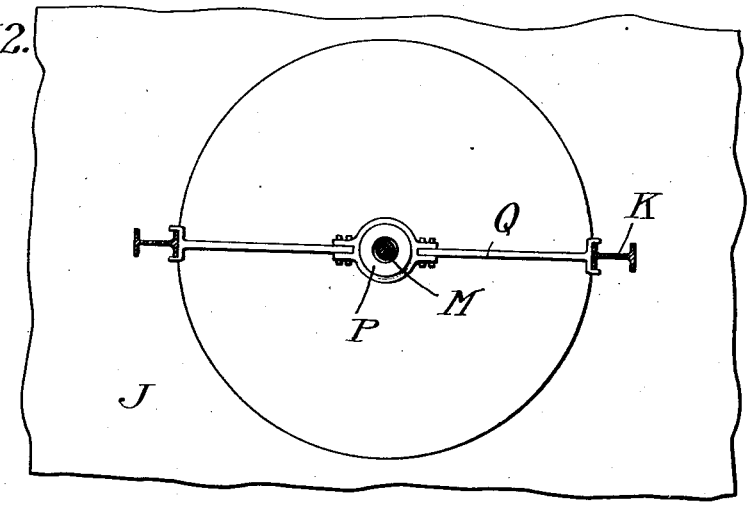
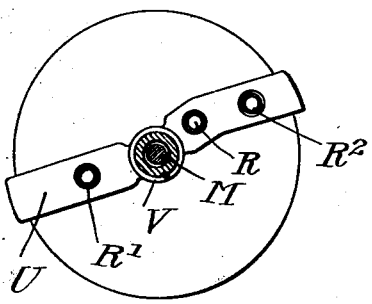
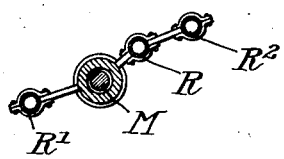
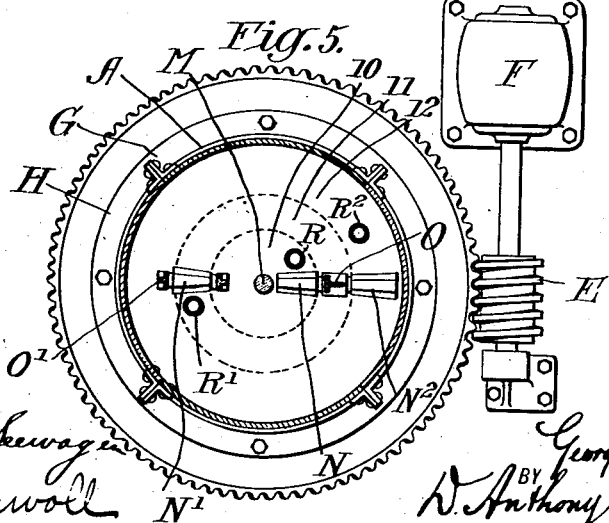
WITNESSES
INVENTOR
Georges Favier
BY D. Anthony Usina
ATTORNEY

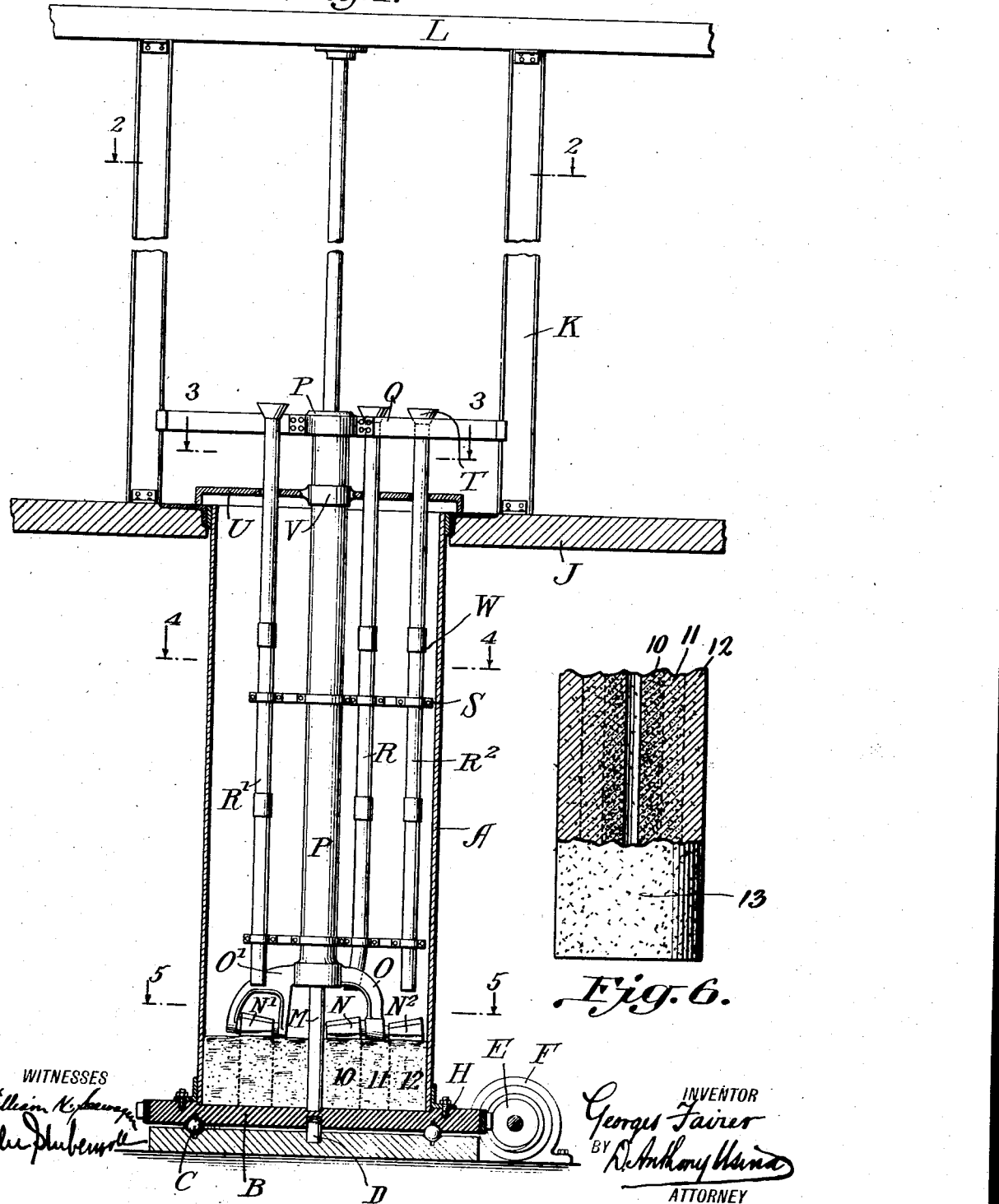

GEORGES FAVIER, OF SUSPENSION BRIDGE, NEW YORK.

MOLDING ELECTRODES.

1,150,021.

Specification of Letters Patent. Patented Aug. 17, 1915.

Application filed April 15, 1914. Serial No. 832,007.

*To all whom it may concern:*

Be it known that I, GEORGES FAVIER, a citizen of the Republic of France, residing in Suspension Bridge, New York, have invented certain new and useful Improvements in Molding Electrodes, of which the following is a specification.

This invention aims to provide certain improvements whereby electrodes of large sizes and of great length can be made with comparatively little difficulty and of a desired composition throughout their cross-section at a low cost.

My process involves two principal points of improvement and certain improvements in detail which are referred to at length hereinafter. The two principal points of improvement are the progressive pressing of the electrode paste as the length of the pressed portion gradually increases, the pressing being preferably effected by means of rollers working on the interior portion of the cross-section as well as on the outer portion; and second, the employment of special pastes which make the central portion of the electrode spongy or porous during the subsequent baking or burning thereof and which greatly facilitates such burning, the pastes being preferably graduated so as to increase the porosity gradually from the outer portion toward the center.

The accompanying drawings illustrate a suitable machine for carrying out the process.

Figure 1 is a vertical diametral section through the mold and adjacent parts, showing the parts within the mold in elevation; Figs. 2, 3, 4 and 5 are respectively horizontal sections on the similarly numbered lines in Fig. 1 the outer casing being omitted from Fig. 4. Fig. 6 is partly a longitudinal section and partly an elevation of an electrode made in accordance with this invention.

These large electrodes are used chiefly in metallurgical furnaces, but may be used in other classes of electrical apparatus.

Referring to the apparatus illustrated, a mold A of cylindrical or similar shape is mounted at its lower end upon a horizontal base B supported upon balls C and upon a pivot D and rotated continuously by means of a worm gear E driven by a motor F. The mold may be divided into four or any other desired number of segments fastened together by means of vertical flanges G mounted thereon and bolted together as indicated in Fig. 5. At its lower end the mold is mounted on the base B by means of a similar flange H. At its upper end the mold is held in a suitable opening in the floor J which carries a pair of guides K connected by a cross beam L for a purpose hereinafter explained. At the center of the mold there is fixed a round wooden rod M fastened to the base B and extending upward clear to the cross beam L. This rod serves to guide the pressing rollers and also forms the center of the completed electrode.

The compressing of the paste of which the electrode is to be formed is accomplished by means of rollers such for example as the three rollers N, N' and N². The roller N' covers substantially the middle third of the space between the central rod M and the mold; and the rollers N and N² cover respectively the inner and the outer third of such space. These rollers may be polygonal as indicated or may be circular or may be of any other desired shape, and are preferably smaller at their inner ends to compensate for the comparatively slower rate of movement as the rollers rotate about the rod M. The rollers are mounted in arms O, O' on the lower end of a tube P which surrounds the rod M freely. The tube P extends upward above the floor J and carries arms Q, the ends of which embrace the guides K so as to prevent rotation of the tube P. Thus as the base B and mold A are rotated the central rod M is also rotated, but the rollers N, N' and N² (though rotating on their individual axes) do not rotate around the rod M. There is thus a relative rotation of the mold and of the paste therein on the one hand and the rollers N, N' and N² on the other hand.

The paste is fed continuously and regularly and is compacted by the relative movement of the rollers thereon. As the quantity of molded paste increases the rollers continually ride on the top and, therefore, rise slowly, carrying with them the entire frame P, Q on which they are mounted. There is thus produced a very thorough compacting of the paste throughout the cross section and throughout the height of the electrode. The paste may be fed into the mold in various ways and by various means using the above described method of compacting it uniformly and making it of any desired height. I prefer, however, to feed the paste in the particular way hereinafter described. I feed several different compositions of paste at different points between the center and the outer surface of the electrode. Preferably three different pastes are used and each is fed just in advance of one of the respective rollers N, N' and N² so as to produce a plurality of roughly outlined concentric zones or rings 10, 11 and 12 (Figs. 1 and 5) of differing materials graded toward the center. The paste which is fed just in front of the outermost roller N² is the purest graphite or similar conducting material. The paste fed in front of the intermediate roller N' is a mixture of the paste used for the outermost ring with saw dust or similar material which will burn out during the burning of the electrode and will render the latter more or less spongy so as to facilitate the escape of the gases produced in the burning and thus permit a very quick and a very regular burning, which in turn produces an economy of time and of fuel. In front of the innermost roller N there is fed a paste containing a still greater proportion of saw dust or the like. Thus an electrode of increasing porosity toward the center is produced. At the same time the distribution of the material is very regular and substantially the same throughout the cross section at all points in the height. The wooden rod M is converted into charcoal during the first moments of the burning of the electrode and by reason of the great porosity of such charcoal it forms practically a chimney for the escape of the gases generated. Such gases, therefore, escape readily from all points in the cross section inward and do not exert any serious pressure upon the outer surface of the electrode.

In the apparatus illustrated the means for feeding the paste comprise a set of vertical tubes R, R' and R² mounted in brackets S carried by the tube P and provided at their upper ends with hoppers T into which the material is fed at a rate which is uniform for the three hoppers. These hoppers are located just above a platform U which covers the top of the mold and facilitates access of the workmen to the feed hoppers. The platform U rests on the floor J and has a central ring V surrounding the tube P and through which this tube rises as the height of the molded electrode increases. The pipes R, R' and R² are made in sections of any desired length, say three feet, united by couplings W. When the feeding has continued sufficiently to bring the hoppers T more than three feet above the platform then the uppermost section of each feed pipe may be taken off and the hoppers may be applied to the next sections of the pipe so as to keep the hoppers within reach of the workmen on the platform U.

Though I have described with great particularity of detail a certain apparatus yet it will be understood that various styles of apparatus may be used for carrying out my improved process. The rollers are preferably of truncated pyramidal shapes in order to effect a certain amalgamation of the paste, but they may be conical or otherwise shaped. They may be solid or hollow or of practically any composition, though I prefer that their external portions shall contain some copper because this metal does not adhere strongly to the paste. Of course, it is only necessary to have a relative movement of rotation of the roller-carrying frame with respect to the mold. Either may be rotated about the central axis of the mold while the other is held stationary with the same result upon the material being molded. Similarly the relative vertical movement may be secured either by causing the contacting rollers to rise as the height of the molded paste increases or by lowering the body of paste similarly. The number of rollers used may be increased or diminished according to the diameter of the electrode to be molded and other circumstances and their shape may be varied. Likewise the number of rings of paste of different compositions may be greater or less than the three described and their compositions may also be different from those described. The paste may be fed either by hand or by any usual or suitable mechanism for feeding regular quantities of such materials. The wooden rod at the center may be made of greater or less size depending on the size of the electrode and upon the composition of the paste and the expected volume of gases generated in the paste during burning. There is no great amount of strain on this rod and it may be entirely omitted, especially in electrodes of comparatively small diameter and other means used for holding the roller-supporting frame centrally of the mold.

A portion of an electrode 13 molded according to this invention and then burned in the usual way is shown in Fig. 6.

It will thus be seen that by this process we can make electrodes of any desired diameter and of any desired length with no practical difficulties and that such electrodes may be molded of any internal composition. It will also be seen that the molded electrode will be of the greatest homogeneity and will permit an economical and rapid burning and when burned will possess in the highest degree the virtues of conductibility and great regularity and will be practically without cracks or similar defects.

The burning referred to is necessary for all electrodes in order to eliminate volatile particles or gases. With electrodes molded in the old way of uniform density it has not been possible in all cases to effect a complete distillation. Such imperfectly burned electrodes tend to break into pieces under sudden increase of temperature when in use in electric furnaces, thus stopping the operation of the furnace as well as losing the electrode. In burning an electrode of one meter diameter for example, supposing it molded in the old way of uniform density, the heat will penetrate very slowly from the outside toward the center and the distillation will generally be imperfect in the center, and there will be occasional surface irregularities due to the escape of gases outward suddenly at particular points; whereas in burning an electrode molded according to this invention, the more porous center will liberate its gases more freely, so as to compensate in a measure for the slower heating of the interior; and with a wooden core, which is quickly converted to charcoal, the heat will have quick access and the distillation products an easy exit from the central part of the electrode. Thus electrodes of this character can be burned more rapidly and more cheaply and will be found of a more uniformly good quality than those heretofore known.

What I claim is—

1. In the manufacture of electrodes the method which consists in molding the electrode of different compositions arranged in concentric zones, the inner zone having a greater percentage of combustible material in its composition, and then burning the combustible material whereby the inner zone is rendered more porous than the outer zone.

2. An electrode comprising concentric zones of material of increasing porosity toward the center.

3. An electrode comprising concentric zones of material of increasing porosity toward the center, the particles of one zone being intermingled with those of the next to form a unitary structure.

4. An electrode comprising concentric zones of material of increasing porosity toward the center, the outer zone being of the most highly conductive material and the center being of charcoal.

5. An electrode comprising concentric zones of material of increasing porosity toward the center, the outer zone being of the most highly conductive material.

6. An electrode comprising concentric zones of material of increasing porosity toward the center, the center being of charcoal.

In witness whereof, I have hereunto signed my name in the presence of two subscribing witnesses.

GEORGES FAVIER.

Witnesses:
  ANDREW THOMPSON,
  PAUL MORRIS.